(12) United States Patent
Li et al.

(10) Patent No.: US 10,554,344 B2
(45) Date of Patent: Feb. 4, 2020

(54) FEEDBACK METHOD FOR HYBRID AUTOMATIC REPEAT REQUEST AND AN APPARATUS THEREOF

(71) Applicant: YULONG COMPUTER TELECOMMUNICATION SCIENTIFIC (SHENZHEN) CO., LTD., Shenzhen (CN)

(72) Inventors: Mingju Li, Shenzhen (CN); Yunfei Zhang, Shenzhen (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/005,646

(22) Filed: Jun. 11, 2018

(65) Prior Publication Data

US 2018/0367258 A1 Dec. 20, 2018

(30) Foreign Application Priority Data

Jun. 16, 2017 (CN) .......................... 2017 1 0459657

(51) Int. Cl.
*H04L 1/18* (2006.01)
*H04L 5/00* (2006.01)
*H04L 1/00* (2006.01)

(52) U.S. Cl.
CPC .......... *H04L 1/1812* (2013.01); *H04L 1/1861* (2013.01); *H04L 1/1864* (2013.01); *H04L 1/1896* (2013.01); *H04L 5/0055* (2013.01); *H04L 1/00* (2013.01); *H04L 1/1822* (2013.01)

(58) Field of Classification Search
CPC ............. H04W 4/00; H04B 7/216; H04L 1/16
USPC .................................. 370/252–537
See application file for complete search history.

(56) References Cited

U.S. PATENT DOCUMENTS

| 2016/0226643 | A1  | 8/2016  | Mallik et al. |
| 2016/0233999 | A1  | 8/2016  | Chendamarai Kannan et al. |
| 2018/0351706 | A1* | 12/2018 | Park .................. H04L 1/1819 |
| 2019/0207734 | A1* | 7/2019  | Yang .................. H04L 5/001 |

OTHER PUBLICATIONS

Extended European Search Report issued in parallel European Application No. 18171384-1219, dated Oct. 8, 2018, 9 pages.
(Continued)

*Primary Examiner* — Iqbal Zaidi
(74) *Attorney, Agent, or Firm* — Bayes PLLC

(57) ABSTRACT

The present disclosure provides a feedback method for Hybrid Automatic Repeat request, wherein, the method comprises: a network device sends a first configuration signal to a terminal device, the first configuration signal is for indicating a reception feedback manner which includes a manner of sending HARQ feedback in units of Code block Groups; the network device sends a first Transport Block to the terminal device, the first Transport Block comprises at least one Code Block Group; the terminal device sends HARQ feedback to the network device by using the reception feedback manner indicated by the first configuration signal according to a reception result of the first Transport Block. By means of the technical scheme of the present disclosure, unnecessary retransmission can be avoided, system resource can be saved, and transmission efficiency can be increased.

15 Claims, 3 Drawing Sheets

(56) References Cited

OTHER PUBLICATIONS

NTT DOCOMO, INC., "CBG based (re)transmission, preemption indication and subsequent transmission on NR", 3GPP TSG-RAN WG1 Meeting #89, R-1708384, Hangzhou, P.R. China, May 15-19, 2017, 8 pages.
LG Electronics, "Consideration on CB group based HARQ-ACK feedback", 3GPP TSG-RAN WG1 Meeting #89, R-1707662, Hangzhou, China May 15-19, 2017, 6 pages.
MEDIATEK Inc., "On multiple HARQ bits per TB and feedback mechanism", 3GPP TSG RAN WG1 Meeting #88, R1702738, Athens, Greece, Feb. 13-17, 2017, 4 pages.
Communication Pursuant to Article 94(3) EPC issued in corresponding European Application No. 18 171 384.3-1219, dated Sep. 25, 2019, 5 pages.
First Office action issued in corresponding Chinese Application No. 201710459657, dated Oct. 29, 2019, with English translation, 10 pages.

\* cited by examiner

FEEDBACK METHOD FOR HYBRID AUTOMATIC REPEAT REQUEST AND AN APPARATUS THEREOF

CROSS REFERENCE

This application claims priority of Chinese Patent Application No. 201710459657.8 filed on Jun. 16, 2017, entitled "A feedback method for Hybrid Automatic Repeat request and an apparatus thereof", which is incorporated herein by reference in its entirety.

TECHNICAL FIELD

The present disclosure relates to the technical field of wireless communication, and in particular relates to a feedback method for Hybrid Automatic Repeat request and an apparatus thereof.

BACKGROUND

In a wireless transmission process, data is transmitted in in the form of a sub-frame as time transmission unit, and one sub-frame usually transmits one Transport Block (TB).

In Hybrid Automatic Repeat request (HARQ) feedback, a receiving terminal gives feedback on whether or not the data sent from a sending terminal is correctly received. In a system of Long Time Evolution (LTE), the HARQ feedback is performed in TB as a unit, and in the meantime, retransmission is also performed in TB as a unit. In a New Radio (NR) system, the transmission time units occupied by one TB may be one or more OFDM symbols, one or more mini-slots, one or more slots. Since one TB in NR comprises a lot of Code Blocks (CBs), if the HARQ feedback is still in TB as a unit, all the data in a TB would need to be retransmitted under the condition that only one or few CBs in the TB is falsely received, which wastes the system resource.

SUMMARY

In order to solve the above-mentioned problem, the embodiments of the present disclosure provide a feedback method for Hybrid Automatic Repeat request and an apparatus thereof, which can avoid unnecessary retransmission, save system resource and increase transmission efficiency.

A first aspect of the embodiments of the present disclosure provides a feedback method for Hybrid Automatic Repeat request, applied to a terminal device side, comprising:
 receiving a first configuration signal sent from a network device, wherein, the first configuration signal is for indicating a reception feedback manner which includes a manner of sending HARQ feedback in units of Code Block Groups;
 receiving a first Transport Block sent from the network device, wherein, the first Transport Block comprises at least one Code Block Group; and
 sending HARQ feedback to the network device, by using the reception feedback manner indicated by the first configuration signal, according to a reception result of the first Transport Block.

In a possible design, the first configuration signal comprises RRC signal, MAC signal or DCI signal.

In a possible design, the step of sending HARQ feedback to the network device, by using the reception feedback manner indicated by the first configuration signal, according to a reception result of the first Transport Block comprises: sending HARQ feedback by means of UCI information to the network device, by using the reception feedback manner indicated by the first configuration signal, according to a reception result of the first Transport Block, wherein, the UCI information has a UCI format corresponding to the reception feedback manner.

In a possible design, before receiving the first Transport Block sent from the network device, the method comprises: receiving a second configuration signal sent from the network device, wherein, the second configuration signal is for indicating whether the first Transport Block is a retransmitted Transport Block.

In a possible design, under the condition that the reception feedback manner indicated by the first configuration signal is sending HARQ feedback in units of Code Block Groups and that the first Transport Block is a retransmitted Transport Block, the HARQ feedback comprises feedback of reception results of all Code Block Groups in a second Transport Block, wherein, the second Transport Block is a Transport Block first received in an HARQ process corresponding to a target HARQ process number, and the target HARQ process number is an HARQ process number of the first Transport Block.

In a possible design, under the condition that a target Code Block Group exists in the first Transport Block, if the target Code Block Group exists in one or more already received Transport Blocks with the target HARQ process number and is received correctly in at least one Transport Block, the feedback corresponding to the target Code Block Group in the HARQ feedback is ACK; otherwise, the feedback corresponding to the target Code Block Group in the HARQ feedback is NACK.

In a possible design, under the condition that a target Code Block Group does not exist in the first Transport Block but exists in the second Transport Block, if the target Code Block Group exists in one or more already received Transport Blocks with the target HARQ process number and is received correctly in at least one Transport Block, the feedback corresponding to the target Code Block Group in the HARQ feedback is ACK; otherwise, the feedback corresponding to the target Code Block Group in the HARQ feedback is NACK.

In a possible design, under the condition that Code Block Groups in the first Transport Block are all received correctly or all received falsely, the method comprises sending HARQ feedback in units of Transport Blocks to the network device.

In a possible design, the first configuration signal is for indicating a reception feedback manner of a Transport Block on at least one target signal carrier, wherein, the Transport Block on the at least one target signal carrier comprises the first Transport Block.

In a possible design, the first configuration signal is for providing a respective indication of a reception feedback manner of a Transport Block on each individual target signal carrier of the at least one target signal carrier; or the first configuration signal is for providing a unified indication of all Transport Blocks on the at least one target signal carrier.

A second aspect of the embodiments of the present disclosure provides another feedback method for Hybrid Automatic Repeat request, applied to a network device side, comprising:
 sending a first configuration signal to a terminal device, wherein, the first configuration signal is for indicating a reception feedback manner which includes a manner of sending HARQ feedback in units of Code Block Groups;

sending a first Transport Block to a terminal device, wherein, the first Transport Block comprises at least one Code Block Group; and receiving HARQ feedback sent from the terminal device by using the reception feedback manner indicated by the first configuration signal according to a reception result of the first Transport Block.

In a possible design, the first configuration signal comprises RRC signal, MAC signal or DCI signal.

In a possible design, before sending the first Transport Block to the terminal device, the method comprises: sending a second configuration signal to the terminal device, wherein, the second configuration signal is for indicating whether the first Transport Block is a retransmitted Transport Block.

In a possible design, the first configuration signal is for indicating a reception feedback manner of a Transport Block on at least one target signal carrier, wherein, the Transport Block on the at least one target signal carrier comprises the first Transport Block.

In a possible design, the first configuration signal is for providing a respective indication of a reception feedback manner of a Transport Block on each individual target signal carrier of the at least one target signal carrier, or the first configuration signal is for providing a unified indication of all Transport Blocks on the at least one target signal carrier.

A third aspect of the embodiments of the present disclosure provides a terminal device that comprises:

a receiving unit, for receiving a first configuration signal sent from a network device, and also for receiving a first Transport Block sent from the network device, wherein, the first configuration signal is for indicating a reception feedback manner which includes a manner of sending HARQ feedback in units of Code Block Groups and the first Transport Block comprises at least one Code Block Group; and a sending unit, for sending HARQ feedback to the network device, by using the reception feedback manner indicated by the first configuration signal, according to a reception result of the first Transport Block.

The terminal device provided by the third aspect of the embodiments of the present disclosure is for executing the feedback method for Hybrid Automatic Repeat request provided by the first aspect of the present disclosure, and details can refer to the description of the first aspect of the embodiments of the present disclosure, which is not repeatedly described herein.

A fourth aspect of the embodiments of the present disclosure provides a network device that comprises:

a sending unit, for sending a first configuration signal to a terminal device, and also for sending a first Transport Block to a terminal device, wherein, the first configuration signal is for indicating a reception feedback manner which includes a manner of sending HARQ feedback in units of Code Block Groups and the first Transport Block comprises at least one Code Block Group; and a receiving unit, for receiving HARQ feedback sent from the terminal device by using the reception feedback manner indicated by the first configuration signal according to a reception result of the first Transport Block.

The terminal device provided by the fourth aspect of the embodiments of the present disclosure is for executing the feedback method for Hybrid Automatic Repeat request provided by the second aspect of the present disclosure, and details can refer to the description of the second aspect of the embodiments of the present disclosure, which is not repeatedly described herein.

A fifth aspect of the embodiments of the present disclosure provides a network device that comprises a processor, a memory and a transceiver interconnected, wherein, the transceiver is for receiving and sending data, the memory is for storing application program codes to support execution of the above-mentioned method by the network device, and the processor is configured to execute the method of the second aspect described above.

A sixth aspect of the embodiments of the present disclosure provides a network device that comprises a processor, a memory and a transceiver interconnected, wherein, the transceiver is for receiving and sending data, the memory is for storing application program codes to support execution of the above-mentioned method by the terminal device, and the processor is configured to execute the method of the first aspect described above.

A seventh aspect of the embodiments of the present disclosure provides a computer storage medium with a computer program stored therein, the computer program comprises program instructions that, when executed by a processor, causes the processor to execute the method of the first aspect described above.

An eighth aspect of the embodiments of the present disclosure provides a computer storage medium with a computer program stored therein, the computer program comprises program instructions that, when executed by a processor, causes the processor to execute the method of the second aspect described above.

In the embodiments of the present disclosure, the network device sends the first configuration signal to the terminal device so as to indicate a reception feedback manner for the terminal device, and the terminal device performs HARQ feedback in accordance with the reception feedback manner indicated by this signal after receiving this signal, wherein the reception feedback manner comprises a manner of performing HARQ feedback in CBG as a unit, so that the network device can retransmit part of the CBGs in a TB according to the HARQ feedback, which increases transmission efficiency and saves system resource.

BRIEF DESCRIPTION OF THE DRAWINGS

In order to more clearly describe the technical solutions in the embodiments of the present disclosure, hereinafter, the accompanying drawings used for describing the embodiments will be briefly introduced. Apparently, the accompanying drawings described below are only directed to some embodiments of the present disclosure, and for a person skilled in the art, without expenditure of creative labor, other drawings can be derived on the basis of these accompanying drawings.

DETAILED DESCRIPTION OF EMBODIMENTS

A clear and complete description of the technical solutions of the embodiments of the present disclosure is given below, in conjunction with the accompanying drawings. Apparently, the embodiments described below are part of, but not all of, the embodiments of the present disclosure. All the other embodiments, obtained by a person skilled in the art on the basis of the embodiments described in the present disclosure without expenditure of creative labor, belong to the protection scope of the present disclosure.

Figure 1:
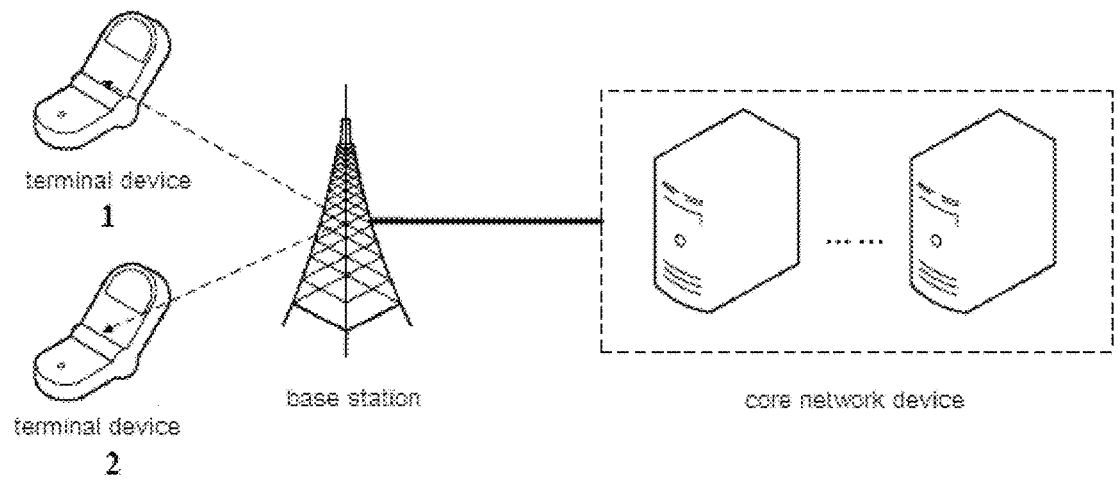
FIG. 1 is a schematic diagram of a wireless communication system architecture provided by the embodiments of the present disclosure.

The embodiments of the present disclosure may be applied to a wireless communication system which usually is composed of communication cells, each communication cell has a base station (BS) for providing communication service to a plurality of terminal devices, wherein the base station is connected to a core network device, as shown in FIG. 1. Wherein, the base station comprises a Baseband Unit (BBU) and a Remote Radio Unit (RRU). The BBU and the RRU may be placed in different locations, for example, the RRU is placed far in an open area for increasing traffic capacity, and the BBU is placed in a central machine room; the BBU and the RRU may also be placed in the same central machine room; the BBU and the RRU may also be different components under the same rack.

It should be noted that, the wireless communication system mentioned in the embodiments of the present disclosure includes, but not limited to, a Narrow Band-Internet of Things (NB-IoT) system, a Global System for Mobile Communication (GSM), an Enhanced Data rate for GSM Evolution (EDGE) system, a Wideband Code Division Multiple Access (WCDMA) system, a Code Division Multiple Access 2000 (CDMA2000) system, a Time Division-Synchronization Code Division Multiple Access (TD-SCDMA) system, a Long Time Evolution (LTE) system, a 5G system, or a future mobile communication system.

In the embodiments of the present disclosure, the base station is a device disposed in a wireless access network for providing wireless communication function to terminal devices.

The base station includes various forms such as a macro base station, a micro base station (also called mini-station), a relay station, an Access Point, a Transmission Receiver Point (TRP). In systems that use different wireless access technology, the names of the device having a function of base station may be different, for example, in a 5G system, it is named generation NodeB (gNB); in an LTE system, it is named evolved NodeB (eNodeB or eNB); in a 3rd Generation (3G) system, it is named Node B (NB). For easy illustration, in all the embodiments of the present disclosure, the devices for providing wireless communication function to terminal devices are called by a joint name of network device.

The terminal device involved in the embodiments of the present disclosure may include various devices provided with wireless communication function, such as a handheld device, an onboard device, a wearable device, a computing device or other processing devices connected to a wireless Modulator-Demodulator (Modem). The terminal device may also be named Mobile Station (MS) or Terminal. and may include a subscriber unit, a cellular phone, a smartphone, a wireless data card, a Personal Digital Assistant (PDA), a tablet computer, a wireless Modem, a handset, a laptop computer, a Machine Type Communication (MTC) terminal. For easy illustration, in all the embodiments of the present disclosure, the devices mentioned above are called by a joint name of terminal device.

In order for a better understanding of the method of the embodiments of the present disclosure, firstly, the types of TBs involved in the embodiments of the present disclosure are introduced. In the embodiments of the present disclosure, the TBs involved are classified into the following two types:

The first type is non-retransmitted TB, also called first time transmitted TB, first transmitted TB, or initially transmitted TB. The non-retransmitted TB refers to a TB that has never been received before a terminal device receives the current TB. The second type is retransmitted TB, also called non-first time transmitted TB, TB transmitted again, or second time transmitted TB. The retransmitted TB refers to a TB that has already been received before a terminal device receives the current TB, which is a TB that already exists in the terminal device and has the same serial number or identity as the currently received TB. The transmission of a retransmitted TB can be regarded as an Nth transmission (N is a positive integer greater than 1) of a non-retransmitted TB having a correspondence relation therewith, the correspondence relation between the retransmitted TB and the non-retransmitted TB may be that they have the same serial number/identity (the serial number/identity uniquely identifies one TB); the correspondence relation between the retransmitted TB and the non-retransmitted TB may also be that they have the same HARQ process number, wherein, the retransmitted TB and the non-retransmitted TB belong to the same HARQ process, the non-retransmitted TB is the first TB in the HARQ process corresponding to a target HARQ process number, and the target HARQ process number is the HARQ process number of the retransmitted TB.

Hereinafter, examples are given to illustrate a retransmitted TB and a non-retransmitted TB.

For example, when a network device sends 5 TBs to a terminal device, these 5 TBs are given the serial numbers of 1, 2, 3, 4 and 5, and it is assumed that TBs with serial numbers of 1, 2 and 3 already exist in the terminal device and TBs with serial numbers of 4 and 5 do not exist in the terminal device, under such circumstances, when the TBs with serial numbers of 1, 2 and 3 are currently transmitted by the network device, the network device is transmitting retransmitted TBs; when the TBs with serial numbers of 4 and 5 are currently transmitted by the network device, the network device is transmitting non-retransmitted TBs.

A network device sends retransmitted TBs to a terminal device under two conditions: one condition is that all of or part of the time-frequency resource of a TB is occupied by another service, which causes part of the data in this TB has not been transmitted to the terminal device; the other condition is that the terminal device receives an HARQ feedback for a TB or a CBG in a TB from the terminal device. Accordingly, the CBGs contained in a retransmitted TB are also classified into two types, wherein the first type is a CBG that has been completely sent from a network device to a terminal device but has been falsely received by the terminal device; the second type is a CBG that has not been completely sent to a terminal device because the time-frequency resource of the CBG in a TB becomes occupied by another service during the process of sending the TB from a network device to the terminal device. In an optional embodiment, the retransmitted TB may contain only one type of CBG selected from the first type of CBG and the second type of CBG.

Figure 2:
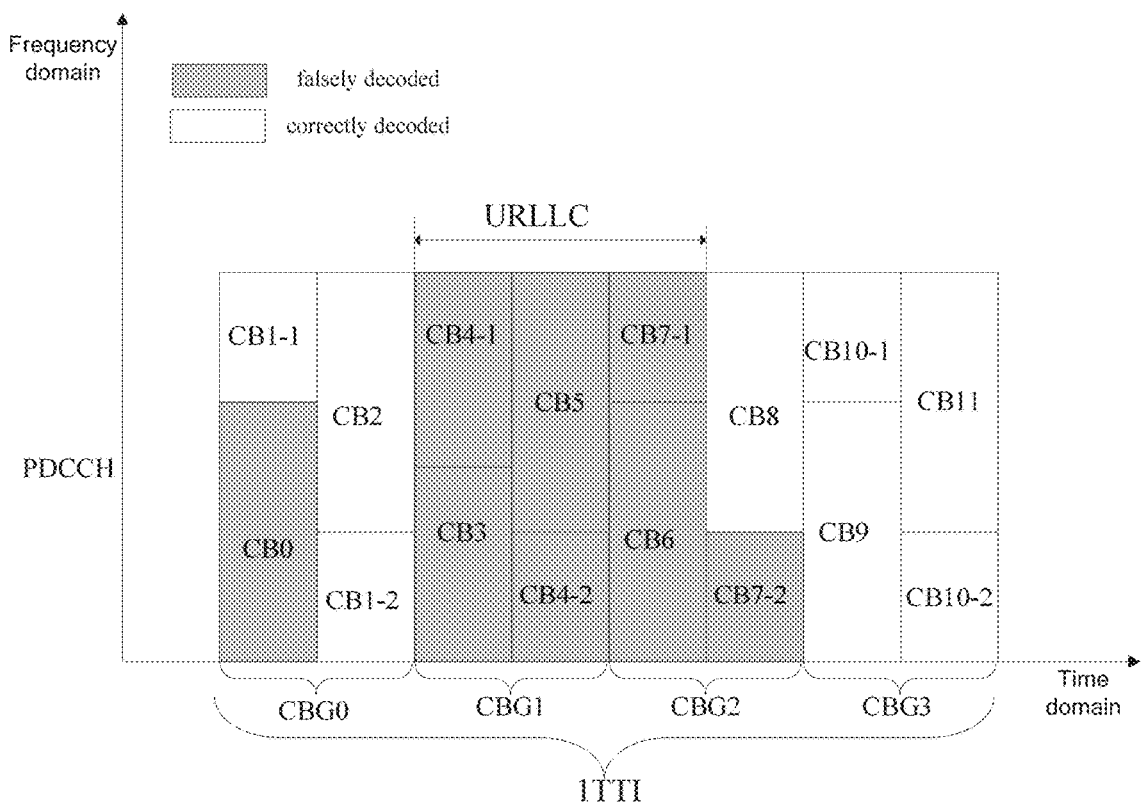
FIG. 2 is a schematic diagram of distribution of CBs and CBGs on time-frequency resource for one TB.

Hereinafter, examples are given to illustrate the three types of CBGs. Referring to FIG. 2, which is a schematic diagram of distribution of CBs and CBGs on time-frequency resource for one TB, as shown in the figure, a TB has 12 TBs, wherein CB0, CB1 and CB2 belong to CBG0; CB3, CB4 and CB5 belong to CBG1; CB6, CB7 and CB8 belong to CBG2; CB9, CB10 and CB11 belong to CBG3. When transmitting the TB, the time-frequency resource of CB3, CB4, CB5, CB6 and part of the time-frequency resource of CB7 are occupied by URLLC service. After a terminal receives the TB, the terminal decodes every CB therein, and it is found that CB0, CB3, CB4, CB5, CB6 and CB7 are falsely decoded, wherein CB0 belongs to CBG0; CB3, CB4, and CB5 belong to CBG1; CB6 and CB7 belong to CBG2. The CBGs that the falsely decoded CBs correspond to need to be retransmitted, i.e. CBG0, CBG1 and CBG2 in this TB need to be retransmitted. Among these CBGs that need to be retransmitted, CBG0 is the first type of CBG, CBG1 and CBG2 are the second type of CBG.

It should be understood that, no matter when the network device transmits a TB, as long as the TB contains a type of CBG selected from the first type of CBG and the second type of CBG, this TB is called a retransmitted TB. For example, for the TB in FIG. 2, under the condition that the network device has not yet received an HARQ feedback from the terminal device, if the network device determines that CBG1 and CBG2 have not been completely sent to the terminal device because part of the time-frequency resource of CBG1 and CBG2 becomes occupied by URLLC service, the network device determines that CBG1 and CBG2 need to be retransmitted, therefore, CBG1 and CBG2 are put in TB1 to be sent to the terminal device, wherein TB1 is a retransmitted TB; under the condition that the network device has received an HARQ feedback from the terminal device, the network device determines that CBG0, CBG1 and CBG2 need to be retransmitted, therefore, CBG0, CBG1 and CBG2 are put in TB2 to be sent to the terminal device, wherein TB2 is a retransmitted TB; under the condition that the network device has not yet received an HARQ feedback from the terminal device, if the network device determines that CBG1 and CBG2 have not been completely sent to the terminal device because part of the time-frequency resource of CBG1 and CBG2 becomes occupied by URLLC service, the network device sends a preemption indication to the terminal device so as to inform the terminal device of which part of time-frequency resource is occupied by another service (or furthermore, the network device puts CBG1 and CBG2 in TB1 to be sent to the terminal device, wherein TB1 is a retransmitted TB), so that the terminal device can correctly receive CBG1 and CBG2, and after the network device receives the HARQ feedback, the network device determines that only CBG0 needs to be further retransmitted according to the HARQ feedback, therefore, CBG0 is put in TB3 to be sent to the terminal device, wherein TB3 is a retransmitted TB.

Hereinafter, a feedback method for Hybrid Automatic Repeat request of the embodiments of the present disclosure will be described in detail.

Figure 3:
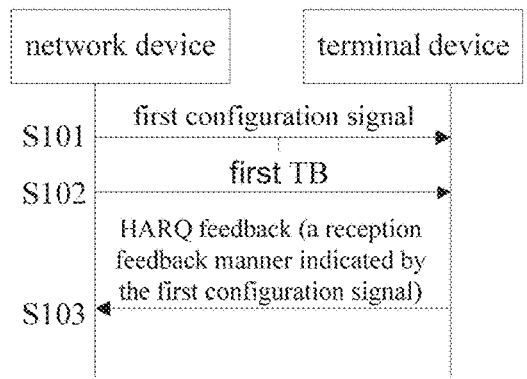
FIG. 3 is a flow chart of a feedback method for Hybrid Automatic Repeat request provided by the embodiments of the present disclosure.

Referring to FIG. 3, which is a flow chart of a feedback method for Hybrid Automatic Repeat request provided by the embodiments of the present disclosure, as shown in the figure, the method comprises:

Step S101, a network device sends a first configuration signal to a terminal device, and the terminal device receives the first configuration signal, wherein, the first configuration signal is for indicating a reception feedback manner which includes a manner of sending HARQ feedback in CBG as a unit.

Optionally, the reception feedback manner also includes a manner of sending HARQ feedback in TB as a unit.

Optionally, the first configuration signal may be Radio Resource Control (RRC) signal, or the first configuration signal may be Media Access Control (MAC) signal, or the first configuration signal may be Downlink Control Information (DCI) signal.

Optionally, when multiple signal carriers are used for transmitting data to the terminal device, the first configuration signal is specifically for indicating a reception feedback manner of a TB on at least one target signal carrier. For example, when the network device uses signal carrier-1 and signal carrier-2 for transmitting data to the terminal device, the first configuration signal may indicate a reception feedback manner of a TB on signal carrier-1 to be a manner of performing HARQ feedback in units of CBGs, and indicate a reception feedback manner of a TB on signal carrier-2 to be a manner of performing HARQ feedback in TB as a unit. In a possible example, the first configuration signal contains a carrier indicator and a reception feedback manner corresponding to the carrier indicator, so as to tell the terminal device to adopt the corresponding reception feedback manner when receiving TBs on a signal carrier indicated by the carrier indicator.

In an optional embodiment, the first configuration signal may provide a respective indication of a reception feedback manner of a TB on each individual target signal carrier of the at least one target signal carrier, or may provide a unified indication of all TBs on the at least one target signal carrier. Wherein, when the TBs on the multiple signal carriers belong to the same service, the first configuration signal provides a unified indication of all TBs on the at least one target signal carrier; when the TBs on the multiple signal carriers do not belong to the same service, the first configuration signal provides a respective indication of a reception feedback manner of a TB on each individual target signal carrier of the multiple target signal carriers. For example, the network device uses three signal carriers for transmitting data to the terminal device, and the three signal carriers are respectively signal carrier-1, signal carrier-2 and signal carrier-3. If the TBs on signal carrier-1, signal carrier-2 and signal carrier-3 all belong to data of enhanced Mobile BroadBand (eMBB) service, the first configuration signal may provide a unified indication of all TBs on the three signal carriers, for example, the first configuration signal contains an indication of sending reception feedback in units of CBGs, then after the terminal device receives the first configuration signal, the terminal device can determine that the feedback manner for all the TBs on the three signal carriers is a manner of sending reception feedback in units of CBGs. If the TBs on signal carrier-1 and signal carrier-2 belong to data of eMBB service and the TBs on signal carrier-3 belong to data of Ultra Reliable Low Latency Communications (URLLC) service, the HARQ feedback manners on the three signal carriers need to be individually indicated, it is assumed that eMBB service needs its HARQ feedback to be performed in units of CBGs and URLLC service needs its HARQ feedback to be performed in TB as a unit, the first configuration signal contains a first indication of sending reception feedback in units of CBGs as well as carrier indicators of signal carrier-1 and signal carrier-2 that are associated with the first indication, and in the meantime, the first configuration signal also contains a second indication of sending reception feedback in TB as a unit as well as a carrier indicator of signal carrier-3 that is associated with the second indication, then after the terminal device receives the first configuration signal, the terminal device can determine that the feedback manner for the TBs on signal carrier-1 and signal carrier-2 is a manner of sending reception feedback in CBG as a unit according to the carrier indicators of signal carrier-1 and signal carrier-2 associated with the first indication, and can determine that that the feedback manner for the TBs on signal carrier-3 is a manner of sending reception feedback in TB as a unit according to the carrier indicator of signal carrier-3 associated with the second indication.

Step S102, the network device sends a first TB to the terminal device, and the terminal device receives the first TB, wherein, the first TB comprises at least one CBG Wherein, the first TB sent from the network device to the terminal device is classified into the following two conditions: the first TB is a retransmitted TB; or the first TB is a non-retransmitted TB. The retransmitted TB and non-retransmitted TB have been introduced in the above description, which are not repeatedly explained herein.

Step S103, the terminal device sends HARQ feedback to the network device by using the reception feedback manner indicated by the first configuration signal according to a reception result of the first TB.

Optionally, if the reception feedback manner indicated by the first configuration signal is a manner of sending HARQ feedback in TB as a unit, the terminal device sends HARQ feedback to the network device according to an overall reception result of the first TB, for example, if the first TB is correctly received, the terminal device sends one Bit of Acknowledgment (ACK) character to the network device; if the first TB is falsely received, the terminal device sends one Bit of Non-Acknowledgment (NACK) character to the network device.

Optionally, if the reception feedback manner indicated by the first configuration signal is a manner of sending HARQ feedback in CBG as a unit, the terminal device sends HARQ feedback to the network device according to reception results of individual CBGs in the first TB, wherein, the terminal device sends one Bit of ACK or NACK for each CBG in the first TB to the network device.

Hereinafter, examples are given for sending HARQ feedback in TB as a unit as well as sending HARQ feedback in CBG as a unit. It is assumed that the terminal device sends 1 in condition of correct reception, i.e. ACK=1, and sends 0 in condition of false reception, i.e. NACK=0, and the first TB has 4 CBGs, namely, CBG1, CBG2. CBG3 and CBG4. When the HARQ feedback is to be sent in TB as a unit, the terminal device performs feedback with respect to an overall reception result of the first TB, wherein, as long as one CBG among the 4 CBGs is falsely received, the HARQ feedback sent from the terminal device to the network device is 0, otherwise, the HARQ feedback sent from the terminal device to the network device is 1. When the HARQ feedback is to be sent in CBG as a unit, the terminal device performs feedback with respect to a reception result of every individual CBG in the first TB, and if CBG1, CBG2 are correctly received and CBG3, CBG4 are falsely received, the HARQ feedback sent from the terminal device to the network device is 1100.

In an optional embodiment, under the condition that the reception feedback manner indicated by the first configuration signal is a manner of sending HARQ feedback in CBG as a unit, if the CBGs in the first TB are all received correctly or all received falsely, it is suitable to send the HARQ feedback in TB as a unit to the network device. For example, the first TB has 4 CBGs, namely, CBG1, CBG2, CBG3 and CBG4, if only one or two CBGs are correctly received or falsely received, the terminal device performs feedback in CBG as a unit according to a reception result of every individual CBG; if the 4 CBGs are all received correctly or all received falsely, the terminal device sends feedback with respect to the entire TB to the network device, which is in particular ACK or NACK.

In an optional embodiment, different reception feedback manners may correspond to different UCI formats, and the terminal device sends HARQ feedback by means of UCI information to the network device by using the reception feedback manner indicated by the first configuration signal according to a reception result of the first TB, wherein, the UCI information has a UCI format corresponding to the reception feedback manner.

In a possible example, the UCI format corresponding to the manner of sending HARQ feedback in TB as a unit has only one information Bit for carrying the HARQ feedback; the UCI format corresponding to the manner of sending HARQ feedback in CBG as a unit has multiple information Bits for carrying the HARQ feedback.

In a possible example, there may be one or more UCI formats corresponding to the manner of sending HARQ feedback in CBG as a unit. Under the condition that the manner of sending HARQ feedback in CBG as a unit corresponds to multiple UCI formats, the terminal device can select a UCI format for performing feedback according to the numbers of CBGs to perform feedback for, under the condition that the manner of sending HARQ feedback in CBG as a unit corresponds to only one UCI format, when the terminal device determines to send HARQ feedback in CBG as a unit, the terminal device uses this UCI format for performing feedback.

Optionally, under the condition that the first configuration signal is RRC signal or MAC signal, the first configuration signal is for instructing the terminal device to use the same reception feedback manner for all TBs received after receiving the first configuration signal, until the next configuration signal is received or the transmission of the current service is over. For example, the reception feedback manner indicated by the first configuration signal is a manner of sending HARQ feedback in CBG as a unit, then after the terminal device receives the first configuration signal, the terminal device sends HARQ feedback in CBG as a unit to the network device for the first TB received and all TBs subsequently received after the first TB.

Optionally, under the condition that the first configuration signal is DCI signal, the first configuration signal is for indicating the reception feedback manner for one TB, for example, the first configuration signal is a DCI signal for dispatching the first TB and indicating the reception feedback manner for the first TB, and if the reception feedback manner indicated by this DCI signal is a manner of sending HARQ feedback in CBG as a unit, the terminal device sends HARQ feedback in CBG as a unit to the network device for the first TB.

In the embodiments of the present disclosure, the network device sends the first configuration signal to the terminal device so as to clearly indicate a reception feedback manner for the terminal device to perform HARQ feedback, which facilitates data retransmission; besides, the reception feedback manner comprises a manner of performing HARQ feedback in CBG as a unit, so that the network device can only retransmit part of the CBGs in a TB according to this feedback manner, which increases transmission efficiency and saves system resource.

Figure 4:
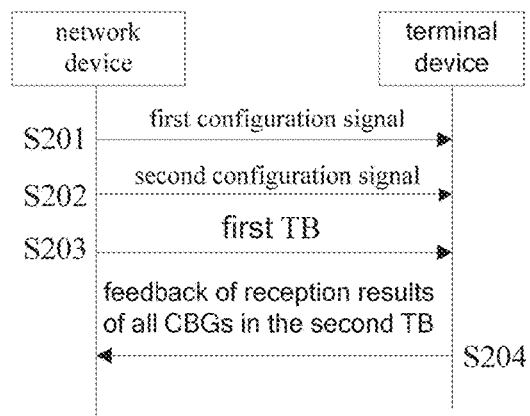
FIG. 4 is a flow chart of another feedback method for Hybrid Automatic Repeat request provided by the embodiments of the present disclosure.

In a possible scenario, under circumstances of bad communication condition and large interference, there occurs decoding error during the process of receiving HARQ feedback from the terminal device by the network device, for example, ACK sent from the terminal device is wrongly decoded as NACK, or NACK is wrongly decoded as ACK. When performing HARQ feedback in CBG as a unit, the network device might transmit more CBGs or less CBGs than desired when performing retransmission in CBG as a unit because of the decoding error. At this time, under the condition of receiving more CBGs or less CBGs than desired, the terminal device needs to perform feedback for such part of CBGs. Referring to FIG. 4, which is a flow chart of another feedback method for Hybrid Automatic Repeat request provided by the embodiments of the present disclosure, as shown in the figure, the method comprises:

Step S201, a network device sends a first configuration signal to a terminal device, and the terminal device receives the first configuration signal, wherein, the first configuration signal is for indicating a reception feedback manner which includes a manner of sending HARQ feedback in CBG as a unit.

The Step S201 is the same as the Step S101 in the embodiment corresponding to FIG. 3, and its details can refer to the related description of the Step S101, which is not repeated described herein.

Step S202, a network device sends a second configuration signal to a terminal device, and the terminal device receives the second configuration signal, wherein, the second configuration signal is for indicating whether the first TB is a retransmitted TB.

In an optional embodiment, under the condition that the second configuration signal indicates the first TB to be a retransmitted TB, the second configuration signal also indicates which CBGs are contained in the first TB.

In an optional embodiment, under the condition that the second configuration signal indicates the first TB to be a retransmitted TB, the second configuration signal also indicates the decoding manner for the respective CBGs in the first TB.

In an optional embodiment, under the condition that the second configuration signal indicates the first TB to be a retransmitted TB, the second configuration signal also indicates the DCI format of the DCI signal for dispatching the first TB.

In a possible example, the second configuration signal and the first configuration signal may be one signal, that is to say, the first configuration signal contains the second configuration signal or the second configuration signal contains the first configuration signal, i.e. the first configuration signal is also for indicating whether the first TB is a retransmitted TB, or the second configuration signal is also for indicating the reception feedback manner.

In another possible example, as is the condition of the embodiments of the present disclosure, the second configuration signal and the first configuration signal are two independent signals.

In an optional embodiment, the second configuration signal may be DCI signal.

Step S203, the network device sends a first TB to the terminal device, and the terminal device receives the first TB, wherein, the first TB comprises at least one CBG.

Wherein, the first TB sent from the network device to the terminal device is classified into the following two conditions: the first TB is a retransmitted TB; or the first TB is a non-retransmitted TB. The retransmitted TB and non-retransmitted TB have been introduced in the above description, which are not repeatedly explained herein.

Under the condition that the first TB is a retransmitted TB, the terminal device executed Step S204.

Step S204, the terminal device sends HARQ feedback in CBG as a unit to the network device, the HARQ feedback comprises feedback of reception results of all CBGs in a second Transport Block.

Wherein, the second TB is a TB received before the terminal device receives the first TB, the second TB and the first TB belong to the same HARQ process, the second TB is the initial TB in this HARQ process, that is to say, the second TB is a non-retransmitted TB and belongs to the same HARQ process as the first TB.

In a first possible scenario, a target CBG simultaneously exist in the first TB and in the second TB, if this target CBG exists in one or more already received TBs with a target HARQ process number and is received correctly in at least one TB, the feedback corresponding to this target CBG in the HARQ feedback is ACK; otherwise, the feedback corresponding to this target CBG in the HARQ feedback is NACK, wherein, the target HARQ process number is an HARQ process number of the first TB, and the one or more TBs with the target HARQ process number are TBs in a HARQ process corresponding to the first TB.

It should be understood that, the one or more already received TBs with the target HARQ process number mentioned in the first possible scenario include the first TB and other TBs that belong to the same HARQ process as the first TB, and the other TBs include the second TB and TBs received before the first TB is received. The condition that the feedback corresponding to the target CBG is ACK as mentioned in the first possible scenario can be classified into the following three types: (1) this target CBG is falsly received in the other TBs but correctly received in the first TB; (2) this target CBG is falsly received in the first TB but correctly received in at least one TB among the other TBs; (3) this target CBG is correctly received in both the first TB and at least one TB among the other TBs. The condition that the feedback corresponding to the target CBG is NACK as mentioned in the first possible scenario is that this target TB is falsely received in both the first TB and the other TBs.

In a second possible scenario, a target CBG does not exist in the first TB but exists in the second TB, if this target CBG exists in one or more already received TBs with a target HARQ process number and is received correctly in at least one TB, the feedback corresponding to this target CBG in the HARQ feedback is ACK; otherwise, the feedback corresponding to this target CBG in the HARQ feedback is NACK, wherein, the target HARQ process number is an HARQ process number of the first TB, and the one or more TBs with the target HARQ process number are TBs in a HARQ process corresponding to the first TB.

It should be understood that, the one or more already received TBs with the target HARQ process number mentioned in the second possible scenario include the first TB and other TBs that belong to the same HARQ process as the first TB, and these other TBs include the second TB and TBs received before the first TB is received. The condition that the feedback corresponding to the target CBG is ACK as mentioned in the second possible scenario is that this target CBG is correctly received in at least one TB among the other TBs. The condition that the feedback corresponding to the target CBG is NACK as mentioned in the second possible scenario is that this target TB is falsely received in all the other TBs.

Figure 5:
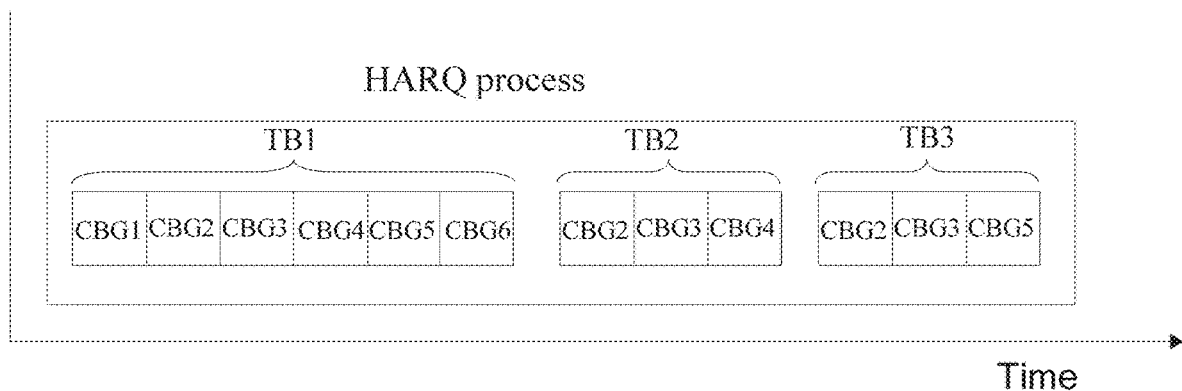
FIG. 5 is a schematic diagram of TBs contained in the same HARQ process.

Hereinafter, an example is given to illustrate the feedback for the target CBG in the two scenarios discussed above. Referring to FIG. 5, it is assumed that TB1, TB2 and TB3 are in the same HARQ process, wherein TB1 is the initial TB in this HARQ process, i.e. TB1 is the second TB, TB1 has 6 CBGs, namely, CBG1, CBG2, CBG3, CBG4, CBG5 and CBG6; TB2 and TB3 are retransmission for TB1; TB2 has CBG2, CBG3 and CBG4, while TB3 has CBG2, CBG3 and CBG5; and TB3 is a TB currently received by the terminal device, i.e. TB3 is the first TB. As known from the transmission status of the 6 CBGs, CBG1, CBG4 and CBG6 are CBGs that meet the second possible scenario mentioned above, and CBG2, CBG3 and CBG5 are CBGs that meet the first possible scenario mentioned above. The HARQ feedback for these 6 CBGs are as follows:

(1) HARQ feedback for CBG1 and CBG6: if correctly received in TB1, the HARQ feedback is ACK; if falsely received in TB1, the HARQ feedback is NACK.

(2) HARQ feedback for CBG4: if correctly received in TB1 or TB2, the HARQ feedback is ACK; if falsely received in both TB1 and TB2, the HARQ feedback is NACK.

(3) HARQ feedback for CBG2 and CBG3: if correctly received in at least one of TB1, TB2 and TB3, the HARQ feedback is ACK; if falsely received in all of TB1, TB2 and TB3, the HARQ feedback is NACK.

(4) HARQ feedback for CBG5: if correctly received in at least one of TB1 and TB3, the HARQ feedback is ACK; if falsely received in both TB1 and TB3, the HARQ feedback is NACK.

For example, ACK=1, NACK=-0, CBG1 is correctly received in TB1, CBG2 is falsely received in all of TB1, TB2 and TB3, CBG3 is correctly received in TB2, CBG4 is correctly received in TB1, CBG2 is falsely received in both TB1 and TB3, CBG6 is correctly received in TB1, then the HARQ feedback sent by the terminal device is 101101.

In the embodiments of the present disclosure, under the condition that the reception feedback manner indicated by the first configuration signal is performing retransmission in CBG as a unit and that the first TB received by the terminal device is a retransmitted TB, the HARQ feedback comprises feedback for all CBGs in a second TB, wherein, the second TB is the initial TB in an HARQ process corresponding to the first TB and is a non-retransmitted TB, therefore, under the condition that the network device retransmits more CBGs or less CBGs than desired because of an HARQ decoding error, the terminal device performs HARQ feedback for all CBGs in the second TB so as to accurately provide feedback for transmission conditions of CBGs in the HARQ process of the first TB and the second TB, thereby reducing the probability of retransmitting more CBGs or less CBGs than desired through the network device.

The method of the embodiments of the present disclosure has been illustrated above in detail, and hereinafter, the device of the embodiments of the present disclosure is provided.

Figure 6:
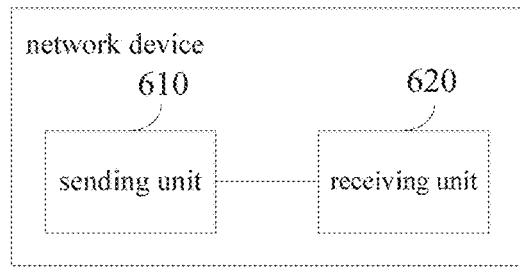
FIG. 6 is a schematic diagram of component structure of a network device provided by the embodiments of the present disclosure.

Referring to FIG. 6, which is a schematic diagram of component structure of a network device provided by the embodiments of the present disclosure, as shown in the figure, the network device comprises:

a sending unit 610, for sending a first configuration signal to a terminal device, and also for sending a first Transport Block to a terminal device, wherein, the first configuration signal is for indicating a reception feedback manner which includes a manner of sending HARQ feedback in units of Code Block Groups and the first Transport Block comprises at least one Code Block Group; and a receiving unit 620, for receiving HARQ feedback sent from the terminal device by using the reception feedback manner indicated by the first configuration signal according to a reception result of the first Transport Block.

Optionally, the first configuration signal comprises RRC signal, MAC signal or DCI signal.

Optionally, the sending unit 610 is also for sending a second configuration signal to the terminal device, wherein, the second configuration signal is for indicating whether the first Transport Block is a retransmitted Transport Block.

Optionally, the first configuration signal is for indicating a reception feedback manner of a Transport Block on at least one target signal carrier, wherein, the Transport Block on the at least one target signal carrier comprises the first Transport Block.

Optionally, the first configuration signal is for providing a respective indication of a reception feedback manner of a Transport Block on each individual target signal carrier of the at least one target signal carrier; or the first configuration signal is for providing a unified indication of all Transport Blocks on the at least one target signal carrier.

It should be noted that, the implementation of the respective units can also refer to the corresponding description of the network device in the method embodiments shown in FIG. 3 or FIG. 4.

In the network device described with reference to FIG. 6, the network device sends the first configuration signal to the terminal device so as to clearly indicate a manner for the terminal device to perform HARQ feedback, and performing HARQ feedback in CBG as a unit can increase transmission efficiency and save system resource.

Figure 7:
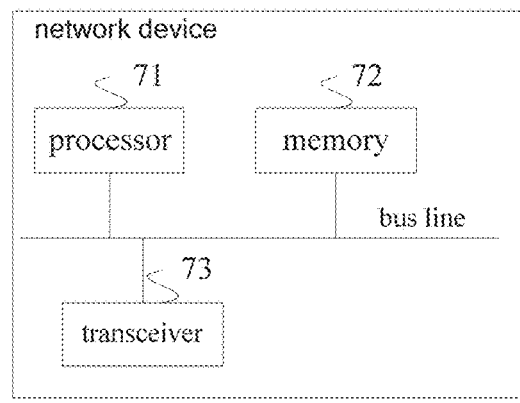
FIG. 7 is a schematic diagram of component structure of another network device provided by the embodiments of the present disclosure.

Referring to FIG. 7, which is a schematic diagram of component structure of another network device provided by the embodiments of the present disclosure, as shown in the figure, the network device comprises a processor 71, a memory 72 and a transceiver 73. The processor 71 is connected to the memory 72 and the transceiver 73, for example, the processor 71 is connected to the memory 72 and the transceiver 73 through a bus line.

The processor 71 is configured to support the network device to execute corresponding functions in the feedback method for Hybrid Automatic Repeat request as shown in FIG. 3 or FIG. 4. The processor 71 may be a Central Processing Unit (CPU), a Network Processor (NP), a hardware chip, or a combination thereof. The aforementioned hardware chip may be an Application-Specific Integrated Circuit (ASIC), a Programmable Logic Device (PLD), or a combination thereof. The aforementioned PLD may be a Complex Programmable Logic Device (CPLD), a Field-Programmable Gate Array (FPGA), a Generic Array Logic (GAL), or a combination thereof.

The memory 72 is for storing program codes, etc. The memory 72 may comprise a Volatile Memory such as a Random Access Memory (RAM); the memory 72 may also comprise a Non-Volatile Memory such as a Read-Only Memory (ROM), a Flash Memory, a Hard Disk Drive (HDD) or a Solid-State Drive (SSD); the memory 82 may also comprise a combination of the aforementioned types of memory.

The transceiver 73 is for transmitting data.

The processor 71 can call the program codes to execute the following operations:

- sending a first configuration signal to a terminal device, wherein, the first configuration signal is for indicating a reception feedback manner which includes a manner of sending HARQ feedback in units of Code Block Groups;
- sending a first Transport Block to a terminal device, wherein, the first Transport Block comprises at least one Code Block Group; and
- receiving HARQ feedback sent from the terminal device by using the reception feedback manner indicated by the first configuration signal according to a reception result of the first Transport Block.

It should be noted that, the processor 71 can also execute the operations executed by the network device in the method shown in FIG. 3 or FIG. 4.

The embodiments of the present disclosure also provides a computer storage medium with a computer program stored therein, the computer program comprises program instructions that, when executed by a computer, causes the computer to execute the method of the aforementioned embodiments, wherein the computer may be a part of the network device mentioned above.

Figure 8:
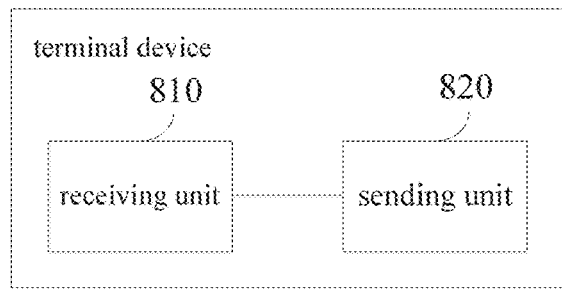
FIG. 8 is a schematic diagram of component structure of a terminal device provided by the embodiments of the present disclosure.

Referring to FIG. 8, which is a schematic diagram of component structure of a terminal device provided by the embodiments of the present disclosure, as shown in the figure, the terminal device comprises:

- a receiving unit 810, for receiving a first configuration signal sent from a network device, and also for receiving a first Transport Block sent from the network device, wherein, the first configuration signal is for indicating a reception feedback manner which includes a manner of sending HARQ feedback in units of Code Block Groups and the first Transport Block comprises at least one Code Block Group; and
- a sending unit 820, for sending HARQ feedback to the network device, by using the reception feedback manner indicated by the first configuration signal, according to a reception result of the first Transport Block.

Optionally, the first configuration signal comprises RRC signal, MAC signal or DCI signal.

Optionally, the sending unit 820 is also for sending HARQ feedback to the network device, by using the reception feedback manner indicated by the first configuration signal, according to a reception result of the first Transport Block.

Optionally, the receiving unit 810 is also for receiving a second configuration signal sent from the network device, wherein, the second configuration signal is for indicating whether the first Transport Block is a retransmitted Transport Block.

Optionally, under the condition that the reception feedback manner indicated by the first configuration signal is sending HARQ feedback in units of Code Block Groups and that the first Transport Block is a retransmitted Transport Block, the HARQ feedback comprises feedback of reception results of all Code Block Groups in a second Transport Block, wherein, the second Transport Block is a Transport Block first received in an HARQ process corresponding to a target HARQ process number, and the target HARQ process number is an HARQ process number of the first Transport Block.

Optionally, under the condition that a target Code Block Group exists in the first Transport Block, if the target Code Block Group exists in one or more already received Transport Blocks with the target HARQ process number and is received correctly in at least one Transport Block, the feedback corresponding to the target Code Block Group in the HARQ feedback is ACK; otherwise, the feedback corresponding to the target Code Block Group in the HARQ feedback is NACK.

Optionally, under the condition that a target Code Block Group does not exist in the first Transport Block but exists in the second Transport Block, if the target Code Block Group exists in one or more already received Transport Blocks with the target HARQ process number and is received correctly in at least one Transport Block, the feedback corresponding to the target Code Block Group in the HARQ feedback is ACK; otherwise, the feedback corresponding to the target Code Block Group in the HARQ feedback is NACK.

Optionally, the sending unit 820 is also for sending HARQ feedback in units of Transport Blocks to the network device under the condition that Code Block Groups in the first Transport Block are all received correctly or all received falsely.

Optionally, the first configuration signal is for indicating a reception feedback manner of a Transport Block on at least one target signal carrier, wherein, the Transport Block on the at least one target signal carrier comprises the first Transport Block.

Optionally, the first configuration signal is for providing a respective indication of a reception feedback manner of a Transport Block on each individual target signal carrier of the at least one target signal carrier, or the first configuration signal is for providing a unified indication of all Transport Blocks on the at least one target signal carrier.

It should be noted that, the implementation of the respective units can also refer to the corresponding description of the terminal device in the method embodiments shown in FIG. 3 or FIG. 4.

In the terminal device of FIG. 8, the terminal device performing feedback according to the reception feedback manner indicated by the first configuration signal, so that the network device can perform retransmission in CBG as a unit, which increases transmission efficiency.

Figure 9:
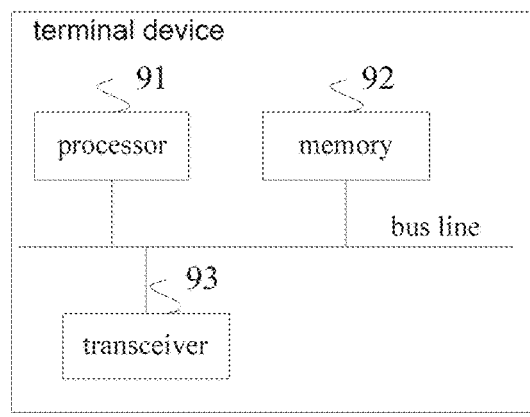
FIG. 9 is a schematic diagram of component structure of another terminal device provided by the embodiments of the present disclosure.

Referring to FIG. 9, which is a schematic diagram of component structure of another terminal device provided by the embodiments of the present disclosure, as shown in the figure, the network device comprises a processor 91, a memory 92 and a transceiver 93. The processor 91 is connected to the memory 92 and the transceiver 93, for example, the processor 91 is connected to the memory 92 and the transceiver 93 through a bus line.

The processor 91 is configured to support the terminal device to execute corresponding functions in the feedback method for Hybrid Automatic Repeat request as shown in FIG. 3 or FIG. 4. The processor 91 may be a Central Processing Unit (CPU), a Network Processor (NP), a hardware chip, or a combination thereof. The aforementioned hardware chip may be an Application-Specific Integrated Circuit (ASIC), a Programmable Logic Device (PLD), or a combination thereof. The aforementioned PLD may be a Complex Programmable Logic Device (CPLD), a Field-Programmable Gate Array (FPGA), a Generic Array Logic (GAL), or a combination thereof.

The memory 92 is for storing program codes, etc. The memory 92 may comprise a Volatile Memory such as a Random Access Memory (RAM); the memory 92 may also comprise a Non-Volatile Memory such as a Read-Only Memory (ROM), a Flash Memory, a Hard Disk Drive (HDD) or a Solid-State Drive (SSD); the memory 92 may also comprise a combination of the aforementioned types of memory.

The transceiver 93 is for transmitting data.

The processor 91 can call the program codes to execute the following operations:

receiving a first configuration signal sent from a network device, wherein, the first configuration signal is for indicating a reception feedback manner which includes a manner of sending HARQ feedback in units of Code Block Groups;

receiving a first Transport Block sent from the network device, wherein, the first Transport Block comprises at least one Code Block Group; and sending HARQ feedback to the network device, by using the reception feedback manner indicated by the first configuration signal, according to a reception result of the first Transport Block.

It should be noted that. The processor 91 can also execute the operations executed by the terminal device in the method shown in FIG. 3 or FIG. 4.

The embodiments of the present disclosure also provides a computer storage medium with a computer program stored therein, the computer program comprises program instructions that, when executed by a computer, causes the computer to execute the method of the aforementioned embodiments, wherein the computer may be a part of the terminal device mentioned above.

As can be understood by a person skilled in the art, all of or part of the steps in the above-described method embodiments can be implemented by related hardware with instructions of a computer program, the program can be stored in a computer readable storage medium, and when the program is executed, it performs the steps of the above-described method embodiments. Wherein, the storage medium may be a magnetic disk, an optical Disk, a Read-Only Memory (ROM) or a Random Access Memory (RAM).

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A feedback method for Hybrid Automatic Repeat request, wherein, the method comprises:

receiving a first configuration signal sent from a network device, wherein, the first configuration signal is for indicating a reception feedback manner which includes a manner of sending HARQ feedback in units of Code Block Groups;

receiving a first Transport Block sent from the network device, wherein, the first Transport Block comprises at least one Code Block Group; and sending HARQ feedback to the network device, by using the reception feedback manner indicated by the first configuration signal, according to a reception result of the first Transport Block, wherein, when the reception feedback manner indicated by the first configuration signal is sending HARQ feedback in units of Code Block Groups and the first Transport Block is a retransmitted Transport Block, the HARQ feedback comprises feedback of reception results of all Code Block Groups in a second Transport Block, wherein, the second Transport Block is a Transport Block first received in an HARQ process corresponding to a target HARQ process number, and the target HARQ process number is an HARQ process number of the first Transport Block.

2. The method according to claim 1, wherein, sending HARQ feedback to the network device, by using the reception feedback manner indicated by the first configuration signal, according to a reception result of the first Transport Block comprises:

sending HARQ feedback by UCI information to the network device, by using the reception feedback manner indicated by the first configuration signal, according to a reception result of the first Transport Block, wherein, the UCI information has a UCI format corresponding to the reception feedback manner.

3. The method according to claim 1, wherein, for a target Code Block Group which exists in the first Transport Block and exists in one or more already received Transport Blocks with the target HARQ process number, the feedback corresponding to the target Code Block Group in the HARQ feedback is ACK if the target Code Block Group is received correctly in at least one of the already received Transport Block; otherwise, the feedback corresponding to the target Code Block Group in the HARQ feedback is NACK.

4. The method according to claim 1, wherein, for a target Code Block Group which does not exist in the first Transport Block but exists in the second Transport Block and exists in one or more already received Transport Blocks with the target HARQ process number, the feedback corresponding to the target Code Block Group in the HARQ feedback is ACK if the target Code Block Group is received correctly in at least one of the already received Transport Block; otherwise, the feedback corresponding to the target Code Block Group in the HARQ feedback is NACK.

5. The method according to claim 1, wherein, the method further comprises:

when Code Block Groups in the first Transport Block are all received correctly or all received falsely, sending HARQ feedback in units of Transport Blocks to the network device.

6. The method according to claim 5, wherein, the first configuration signal is for indicating a reception feedback manner of a Transport Block on at least one target signal carrier, wherein, the Transport Block on the at least one target signal carrier comprises the first Transport Block.

7. The method according to claim 6, wherein, the first configuration signal is for providing a respective indication of a reception feedback manner of a Transport Block on each individual target signal carrier of the at least one target signal carrier; or the first configuration signal is for providing a unified indication of all Transport Blocks on the at least one target signal carrier.

8. A feedback method for Hybrid Automatic Repeat request, wherein, the method comprises:

sending a first configuration signal to a terminal device, wherein, the first configuration signal is for indicating a reception feedback manner which includes a manner of sending HARQ feedback in units of Code Block Groups;

sending a first Transport Block to a terminal device, wherein, the first Transport Block comprises at least one Code Block Group; and receiving HARQ feedback sent from the terminal device by using the reception feedback manner indicated by the first configuration signal according to a reception result of the first Transport Block, wherein, when the reception feedback manner indicated by the first configuration signal is sending HARQ feedback in units of Code Block Groups and the first Transport Block is a retransmitted Transport Block, the HARQ feedback comprises feedback of reception results of all Code Block Groups in a second Transport Block, wherein, the second Transport Block is a Transport Block first received in an HARQ process corresponding to a target HARQ process number, and the target HARQ process number is an HARQ process number of the first Transport Block.

9. A terminal device, wherein, the terminal device comprises a processor, a memory and a transceiver interconnected by a bus line, the transceiver is for sending and receiving data, the memory is for storing program codes, the processor is for calling the program codes stored in the memory to execute the following:

receiving a first configuration signal sent from a network device, and receiving a first Transport Block sent from the network device, wherein, the first configuration signal is for indicating a reception feedback manner which includes a manner of sending HARQ feedback in units of Code Block Groups and the first Transport Block comprises at least one Code Block Group; and sending HARQ feedback to the network device, by using the reception feedback manner indicated by the first configuration signal, according to a reception result of the first Transport Block, wherein, when the reception feedback manner indicated by the first configuration signal is sending HARQ feedback in units of Code Block Groups and the first Transport Block is a retransmitted Transport Block, the HARQ feedback comprises feedback of reception results of all Code Block Groups in a second Transport Block, wherein, the second Transport Block is a Transport Block first received in an HARQ process corresponding to a target HARQ process number, and the target HARQ process number is an HARQ process number of the first Transport Block.

10. The terminal device according to claim 9, wherein, the processor is for:

sending HARQ feedback by UCI information to the network device, by using the reception feedback manner indicated by the first configuration signal, according to a reception result of the first Transport Block, wherein, the UCI information has a UCI format corresponding to the reception feedback manner.

11. The terminal device according to claim 9, wherein, for a target Code Block Group which exists in the first Transport Block and exists in one or more already received Transport Blocks with the target HARQ process number, the feedback corresponding to the target Code Block Group in the HARQ feedback is ACK if the target Code Block Group is received correctly in at least one of the already received Transport Block; otherwise, the feedback corresponding to the target Code Block Group in the HARQ feedback is NACK.

12. The terminal device according to claim 9, wherein, for a target Code Block Group which does not exist in the first Transport Block but exists in the second Transport Block and exists in one or more already received Transport Blocks with the target HARQ process number, the feedback corresponding to the target Code Block Group in the HARQ feedback is ACK if the target Code Block Group is received correctly in at least one of the already received Transport Block; otherwise, the feedback corresponding to the target Code Block Group in the HARQ feedback is NACK.

13. The terminal device according to claim 9, wherein, the processor is for:

sending HARQ feedback in units of Transport Blocks to the network device when Code Block Groups in the first Transport Block are all received correctly or all received falsely.

14. The terminal device according to claim 9, characterized in that, the first configuration signal is for indicating a reception feedback manner of a Transport Block on at least one target signal carrier, wherein, the Transport Block on the at least one target signal carrier comprises the first Transport Block.

15. The terminal device according to claim 14, wherein, the first configuration signal is for providing a respective indication of a reception feedback manner of a Transport Block on each individual target signal carrier of the at least one target signal carrier; or the first configuration signal is for providing a unified indication of all Transport Blocks on the at least one target signal carrier.

* * * * *